United States Patent [19]
Levinson et al.

[11] Patent Number: 5,223,816
[45] Date of Patent: Jun. 29, 1993

[54] SECURITY AND COMMUNICATION SYSTEM WITH LOCATION DETECTION

[76] Inventors: Samuel H. Levinson, 182 Maple Hill Rd., Glencoe, Ill. 60022; Jack R. Caldicott, 28461 W. Kelsey Ct., Barrington, Ill. 60010

[21] Appl. No.: 822,062

[22] Filed: Jan. 17, 1992

[51] Int. Cl.⁵ .................. G08B 1/08; H04Q 1/30
[52] U.S. Cl. .................. 340/539; 340/425; 340/531; 340/536; 455/7; 455/13.1
[58] Field of Search ........... 340/539, 531, 536, 425; 455/7, 9, 11.1, 13.1, 16

[56] References Cited

U.S. PATENT DOCUMENTS

| | | |
|---|---|---|
| 2,135,476 | 11/1938 | Rugh . |
| 3,440,635 | 4/1969 | Hull . |
| 3,594,748 | 7/1971 | Grotjahn . |
| 3,825,833 | 7/1974 | Bogue et al. . |
| 3,914,692 | 10/1975 | Seaborn, Jr. . |
| 3,925,763 | 12/1975 | Wadhwani et al. . |
| 4,083,003 | 4/1978 | Haemming . |
| 4,121,160 | 10/1978 | Cataldo . |
| 4,153,881 | 5/1979 | Permut et al. ............ 340/539 |
| 4,157,540 | 6/1979 | Oros . |
| 4,189,721 | 2/1980 | Doell . |
| 4,319,230 | 3/1982 | Fowler et al. . |
| 4,347,501 | 8/1982 | Akerberg . |
| 4,468,656 | 8/1984 | Clifford et al. . |
| 4,495,495 | 1/1985 | Ormanns et al. . |
| 4,611,198 | 9/1986 | Levinson et al. . |
| 4,630,035 | 12/1986 | Stahl et al. ............ 340/539 |
| 4,764,757 | 8/1988 | DeMarco et al. . |
| 4,868,859 | 9/1989 | Sheffer . |
| 5,027,383 | 6/1991 | Sheffer . |
| 5,055,851 | 10/1991 | Sheffer ............ 340/539 |
| 5,115,224 | 5/1992 | Kostusiak et al. ............ 340/539 |

Primary Examiner—Donnie L. Crosland
Attorney, Agent, or Firm—Gerstman & Ellis, Ltd.

[57] ABSTRACT

An improved security and communication system accurately and quickly locates the position of a signaling portable radio frequency transmitter. When a portable transmitter is activated, a first signal, including identification information, is emitted. The first signal is received by any of a number of radio frequency relays, the signal is manipulated and transmitted to a central processing station as a second signal. The central processing station can, by using the second signals received, either from one or a number of relay stations, determine which relay station is closest to the portable transmitter.

18 Claims, 7 Drawing Sheets

SECURITY AND COMMUNICATION SYSTEM WITH LOCATION DETECTION

BACKGROUND OF THE INVENTION

Many types of security systems presently in operation, including the one described in Levinson and Caldicott, U.S. Pat. No. 4,611,198, provide a means for alerting a central station that an emergency is occurring. In the Levinson and Caldicott patents the system has a security zone that is made up of a number of security nodes, each having a relay station for receiving signals and transmitting them to a central station. The activation of a personal security transmitter sends a signal to the central station via the relay station.

Unfortunately, the signal from a personal security transmitter may be picked up not only by the closest relay station but also by adjacent relay stations. The signals from all of these stations reach the central station and it is then difficult to tell which of the relay stations is closest to the emergency. Valuable time can be lost in trying to find the emergency, particularly when the emergency involves a situation in which the person activating the alarm is incapacitated shortly after activation of the alarm.

There is a need for a security system that can sort through a number of alarm signals transmitted from more than one zone, and determine promptly to which zone emergency assistance should be sent.

It is therefore an object of the present invention to provide an improved security and communication system that allows for the accurate determination of the location of the activator of an alarm.

Other objects and advantages of the present invention will become apparent as the description proceeds.

SUMMARY OF THE INVENTION

In accordance with the present invention, an improved security system is provided having at least one portable frequency transmitter having means, when activated, for emitting a first signal, including a first individual identification code.

A central processing station is provided, as are a plurality of radio frequency relays, comprising receiving means and transmitting means.

Each of the plurality of relays is positioned in a predetermined location and has means to receive and manipulate the first signal, emitted by the portable transmitter, and produce and transmit, to the central processing station, a second signal if necessary. Should a second signal be necessary, the second signal would include the first identification code and a second identification code to identify the relay to the central processing station. All relay stations receiving the first signal and transmitting a second signal to the central processing station provide the necessary information for determining the identity and location of the portable transmitter.

In an illustrative embodiment, the central processing station checks whether the second signal is from a single receiver of more than one receiver. If the second signal is from more than one receiver, the central processing station checks the identification code of the portable transmitter to determine if the second signal is from more than one portable transmitter. If it is from the same portable transmitter the central processing station determines the overlapping areas of the relays and determines the location of the portable transmitter. The portable transmitters in the illustrative embodiment are of a size small enough to be carried by individual users.

In one embodiment of the invention, the means to manipulate the signal is an attenuator. The attenuator is used to adjust the sensitivity and range of each relay so that only those signals within a predetermined and prerecorded range cause the relay to send a signal to the central processing station. In this way fewer relays, and most often only one relay, respond to the alarm signal from a transmitter, and emergency assistance can be sent to the correct location.

In another embodiment of the invention, a threshold detector is used to adjust the effective range of the receiver. Until the signal level exceeds a value determined by the setting of the threshold adjustment, no signal is allowed to pass through to the final stages of the receiver.

In this embodiment, the signal level from the receiver is fed to a comparator where it is compared with a presettable reference voltage. The gate that allows the output of the receiver to pass through to the decoder is only enabled when the signal level exceeds the preset reference. In this way, weak signals, indicating distance from the relay, will not be transmitted to the central processing station. Fewer relays will respond to any given transmitter's signal and concomitantly, the area to search for the activated transmitter will be reduced.

In a further enhancement to this embodiment, the setting of the input attenuator is fed to a range selector encoder. The encoder encodes the range setting and feeds it to the transmitter for encoding with the second signal.

In another embodiment, a precision time clock may be provided in each relay station, providing a very high resolution time source. When an alarm is received, a time encoder circuit is enabled that takes a snap shot of the time. This time is then encoded and fed to the transmitter for relaying to the central processing station with the portable transmitter identification code and the relay station identification code. The central processing station then compares, by means of a microprocessor, the time each relay received the portable transmitter's signal and chooses the earliest time that a relay received the signal. The relay closest to the portable transmitter will receive the first signal earliest, and will have the earliest time stamp. The central computer will recognize this and send assistance to the relay with the earliest time stamp.

A more detailed explanation of the invention is provided in the following description and claims, and is illustrated in the accompanying drawings.

DETAILED DESCRIPTION OF THE ILLUSTRATIVE EMBODIMENTS

Figure 1:
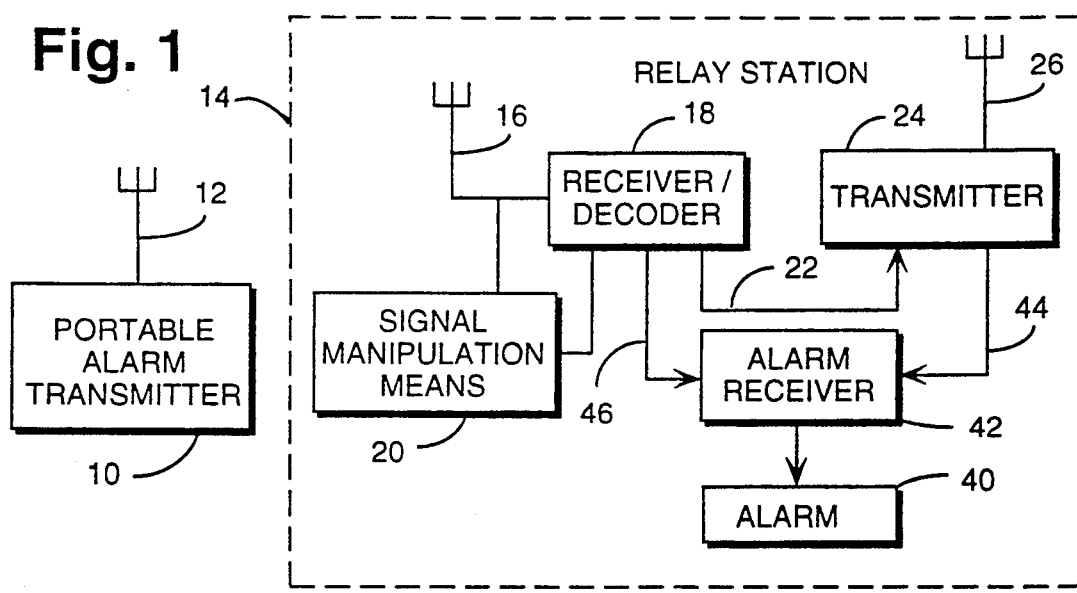
FIG. 1 is a block diagram of a security and communication system, showing the various parts of the system including a portable transmitter, a number of relay station, including one relay station in more detail, and a central processing station, all in accordance with this invention.
Figure 1:
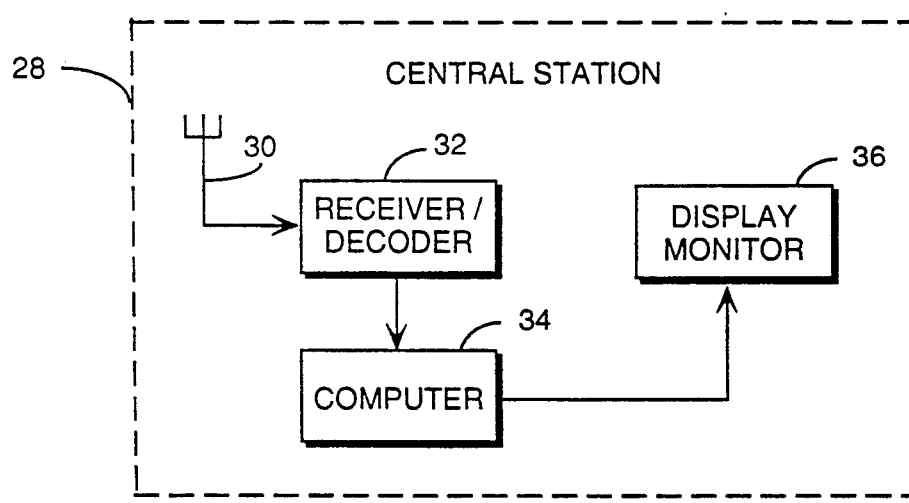
Figure 1:
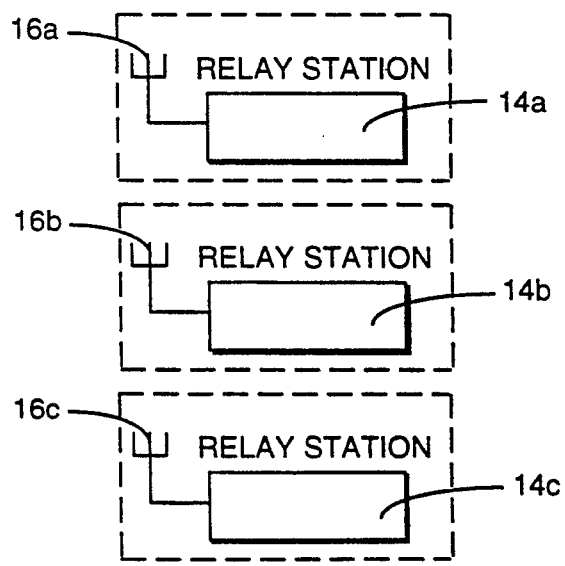

Referring to the drawings, a portable transmitter 10 having an antenna 12 transmits, when activated, a radio frequency signal, including an identification code. A plurality of radio frequency relays 14, 14a, 14b and 14c are positioned respectively in predetermined locations in an area or zone where security is desired. Although only four relays are illustrated here it is to be understood that this invention can accommodate any number of relays.

Each relay 14–14c may be of the specific design as shown for relay 14, having an antenna 16, tuned to receive signals from antenna 12 of each transmitter 10. Relay 14 further includes a receiver/decoder 18 and signal manipulation means 20. Receiver/decoder 18 may be used in combination with signal manipulation means 20 to pick up, decode and manipulate signals received by antenna 16. Once received, decoded and manipulated a signal may be produced and sent via conductor 22 to transmitter/encoder 24. From there any signal produced may be dispatched via antenna 26. The signal incorporates the identification code received from transmitter 10, any information generated by signal manipulation means 20 and the individual identification code of the specific radio frequency relay 14 that received the signal from transmitter 10.

From antenna 26, or, alternatively through a telephone line or the like, the signal may be transmitted to a central processing station 28, which may be located anywhere that is electrically central to the security area or zone.

Further, the signal from antenna 26 may be received by at least some other relays 14a–14c. The signal from antenna 26 may be distinguishable from the signal from antenna 12, for example by use of a different frequency.

Any signal received by antenna 30 of central processing station 28 is conveyed to receiver/decoder 32. A signal is then sent to computer 34 for logging the date, time and various other codes, including first and second identification codes, received in the signal Further, any other codes received by antenna 30 from any other relay station 14–14c, is conveyed to the receiver/decoder 32 and signals are sent to computer 34. Computer 34 compares data from each of the relays 14–14c which have transmitted such data and computes, based on all codes transmitted, the location and identification of the relay closest to the activated portable transmitter 10. This data is then displayed on monitor 36, including the exact location of the closest relay of all of the relays having received the signal from transmitter 10.

Thus, the authorities at central processing station 28 are immediately alerted to the fact that transmitter 10 of known identification has sent a signal. Further, the authorities know the identification of the relay closest to the location of transmitter 10.

Figure 2:
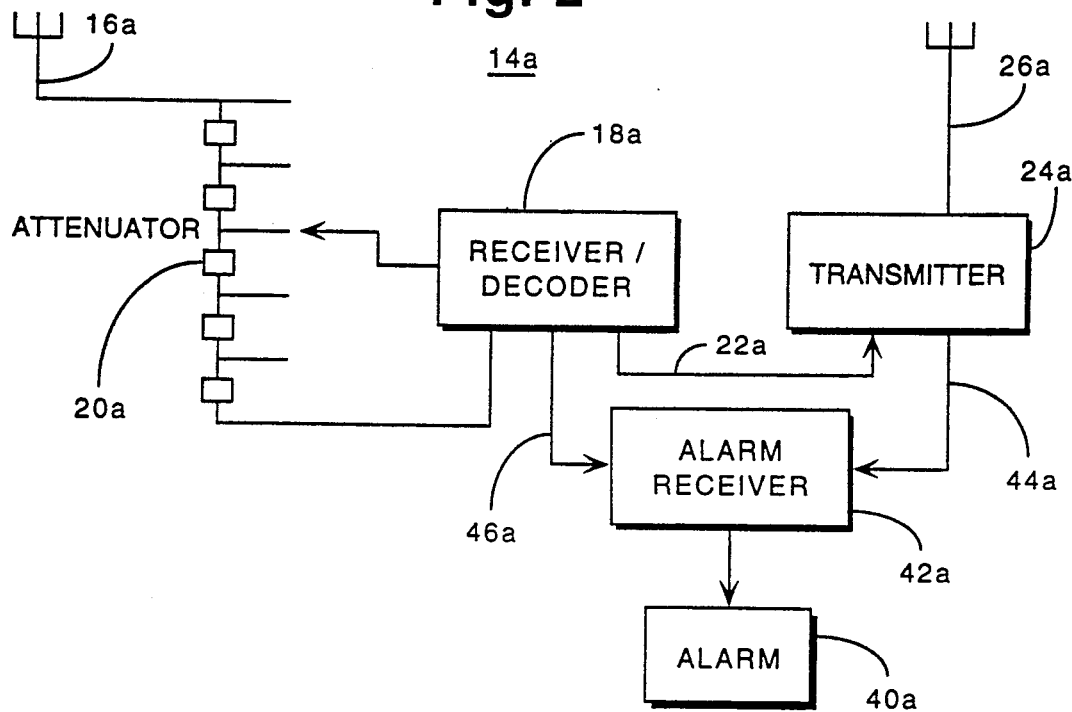
FIG. 2 is a block diagram of one type of relay station that can be used with the security and communication system of the present invention.

In FIG. 2, an attenuator 20a is shown as the signal manipulation means 20. Attenuator 20a is inserted between antenna 16a and receiver/decoder 18a. By adjusting the setting of the attenuator 20a, the sensitivity and hence the range of the receiver 18a can be adjusted. By adjusting each relay in this way only those signals from transmitter 10 that are close to the respective relay will be transmitted by the relay. Fewer overlapping of signals thus occur.

Figure 3:
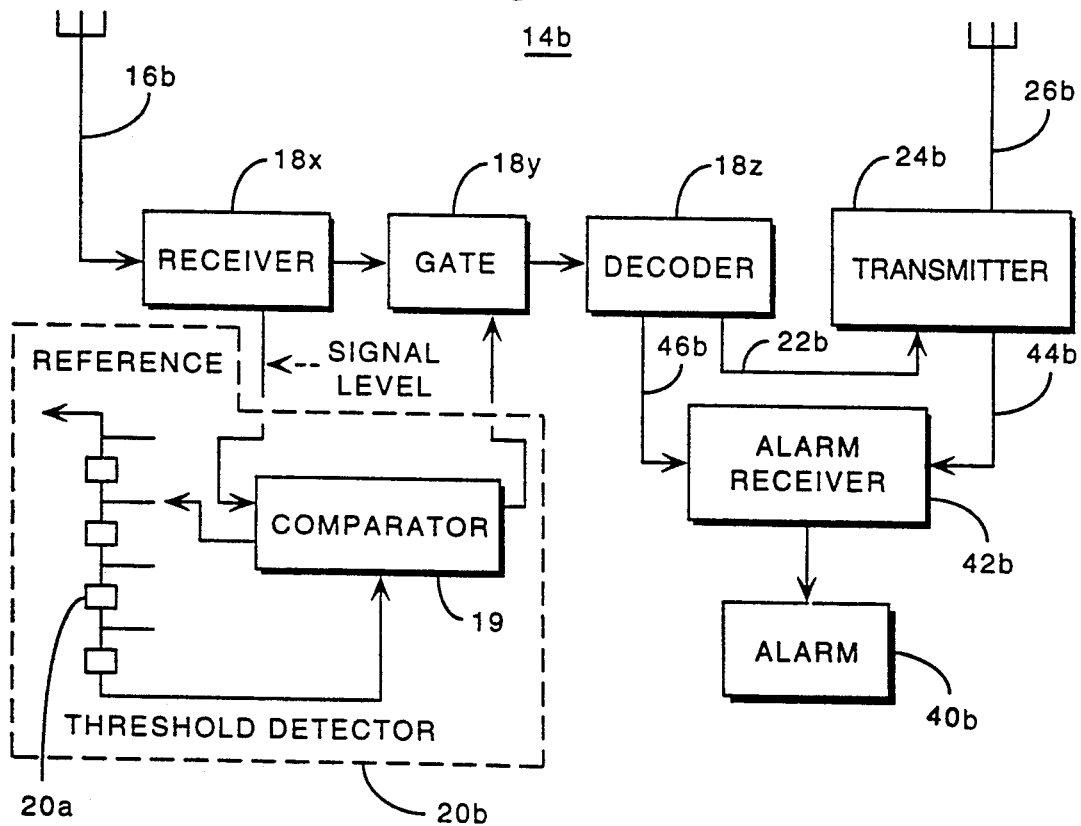
FIG. 3 is a block diagram of another type of relay station that can be used with the security and communication system of the present invention.

Referring to FIG. 3, a threshold detector 20b is shown as the signal manipulation means 20. The threshold detector 20b is used to adjust the effective range of a relay 14b by not allowing signals of less than a certain strength to reach decoder 18z. Until the signal level from antenna 16b exceeds a value preset in the threshold detector 20b no signal is allowed to pass through gate 18y and on to decoder 18z.

In the operation of the threshold detector 20b, the signal level from the receiver 18x is fed to a comparator 19 where it is compared to a preset reference voltage. The gate 18y that allows the output of the receiver 18x to be passed through to the decoder 18z is only enabled when the signal level exceeds the preset reference. In a situation where a relay is distant from the activated transmitter 10, the distant relay will not respond to the transmitter 10 and thus not give a false indication that the transmitter 10 is to be located in the area assigned to the distant transmitter.

Figure 4:
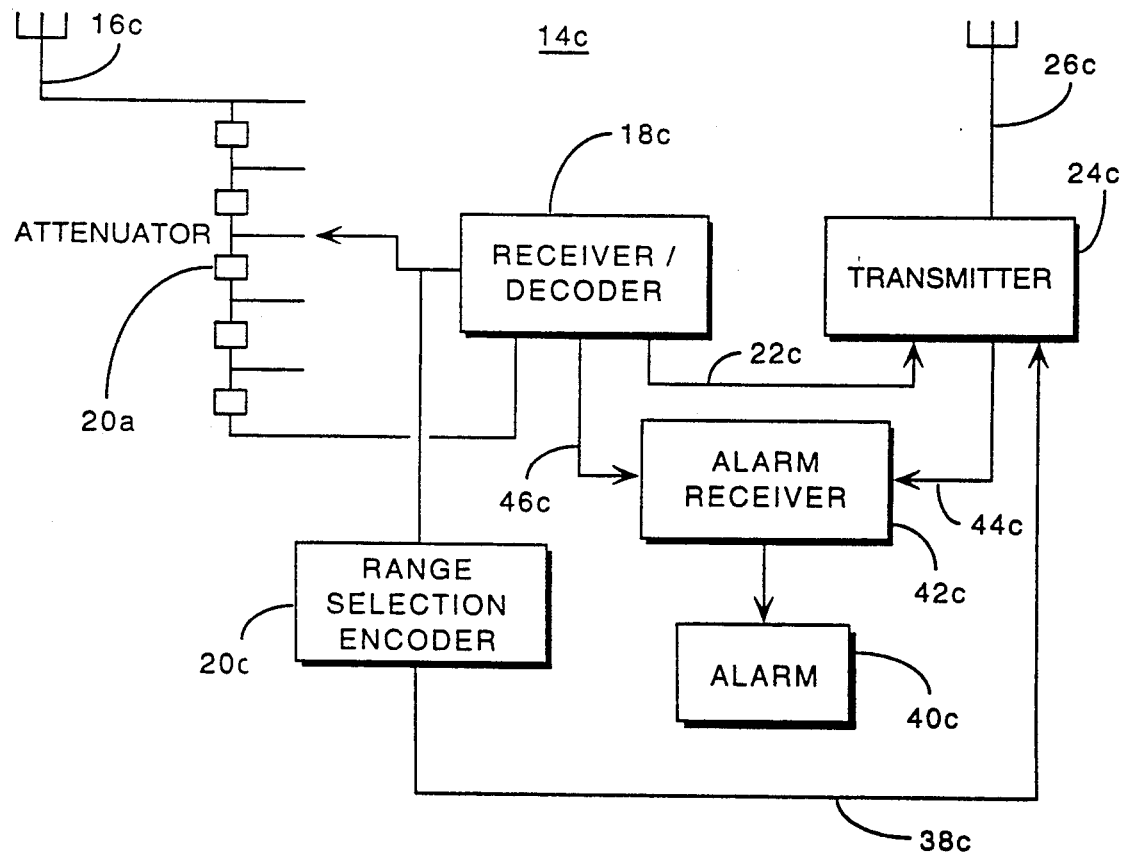
FIG. 4 is a block diagram of another type of relay station that can be used with the security and communication system of the present invention.

In FIG. 4, the system illustrated in FIG. 2 is enhanced with the addition of a range encoder 20c. The setting of the attenuator 20a or the measured range of the receiver/decoder 18c, as adjusted by the attenuator 20a, is encoded, by range encoder 20c. Encoder 20c sends the encoded range to the transmitter 24c along path 38c, for transmission to central processing station 28. Each relay's identification code and range has been preentered into the database of the computer 34 of the central processing station 28.

Upon receiving signals from more than one relay 14 in response to the same signal from transmitter 10, the computer 34 can then select which relay has the weakest sensitivity or range. As the weakest relay will only receive signals from transmitters that are close to it, the weakest relay to receive a signal from the portable transmitter 10 will be the relay closest to the portable transmitter 10.

Further, as each relay has a known range, if more than one relay 14 responds to a given portable transmitter 10 the overlapping area of the relay 14 ranges will assist in pin pointing the location of the portable transmitter 10. This is described in greater detail below and in FIG. 8.

Figure 5:
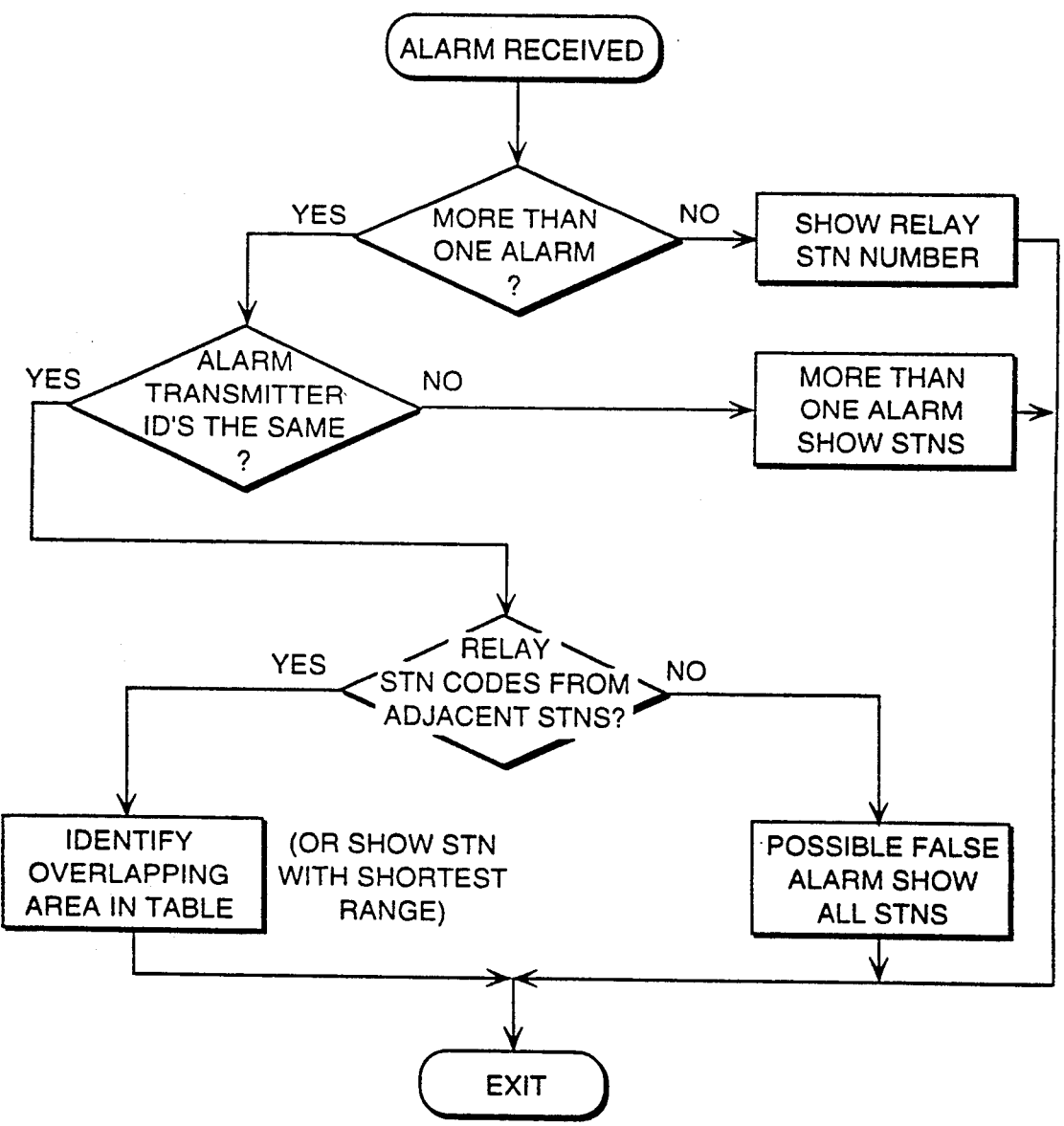
FIG. 5 is a flow chart of a security and communication system in accordance with this invention and using the sensitivity range determination procedures in connection with the FIG. 4 embodiment.

FIG. 5 is a flow chart showing the logic for determining the location of the portable transmitter 10.

Figure 6:
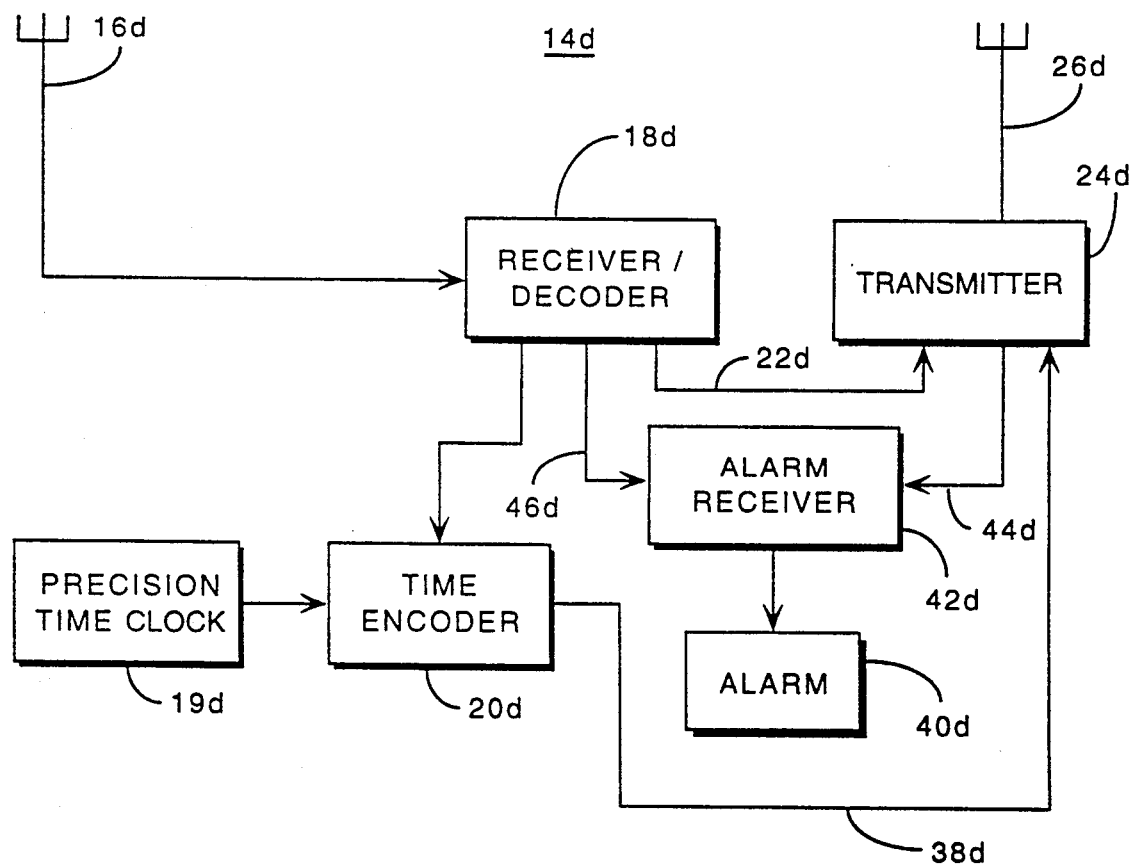
FIG. 6 is a block diagram of another type of relay station that can be used with the security and communication system of the present invention.

In FIG. 6, a precision time clock 19d and a time encoder 20d are shown as the signal manipulation means 20. In the operation of this relay, a first signal from transmitter 10 is received by antenna 16d and sent to both receiver/decoder 18d and time encoder 20d. Time encoder 20d in cooperation with precision time clock 19d produces a time signal having the precise time the first signal was received and sends the time signal to the transmitter 24d, along path 38d. Simultaneously with the time signal being encoded, the receiver/decoder 18d produces and sends to the transmitter 24d a second signal as in the previous illustrations. The second signal and the time signal are then transmitted to the central processing station 28. The second signals and time signals from all relays receiving first signals from portable transmitters 10 are then compared at the central processing station 28, and the relay 14 sending the signal with the earliest time encoded thereon is the relay closest to the portable transmitter 10.

Figure 7:
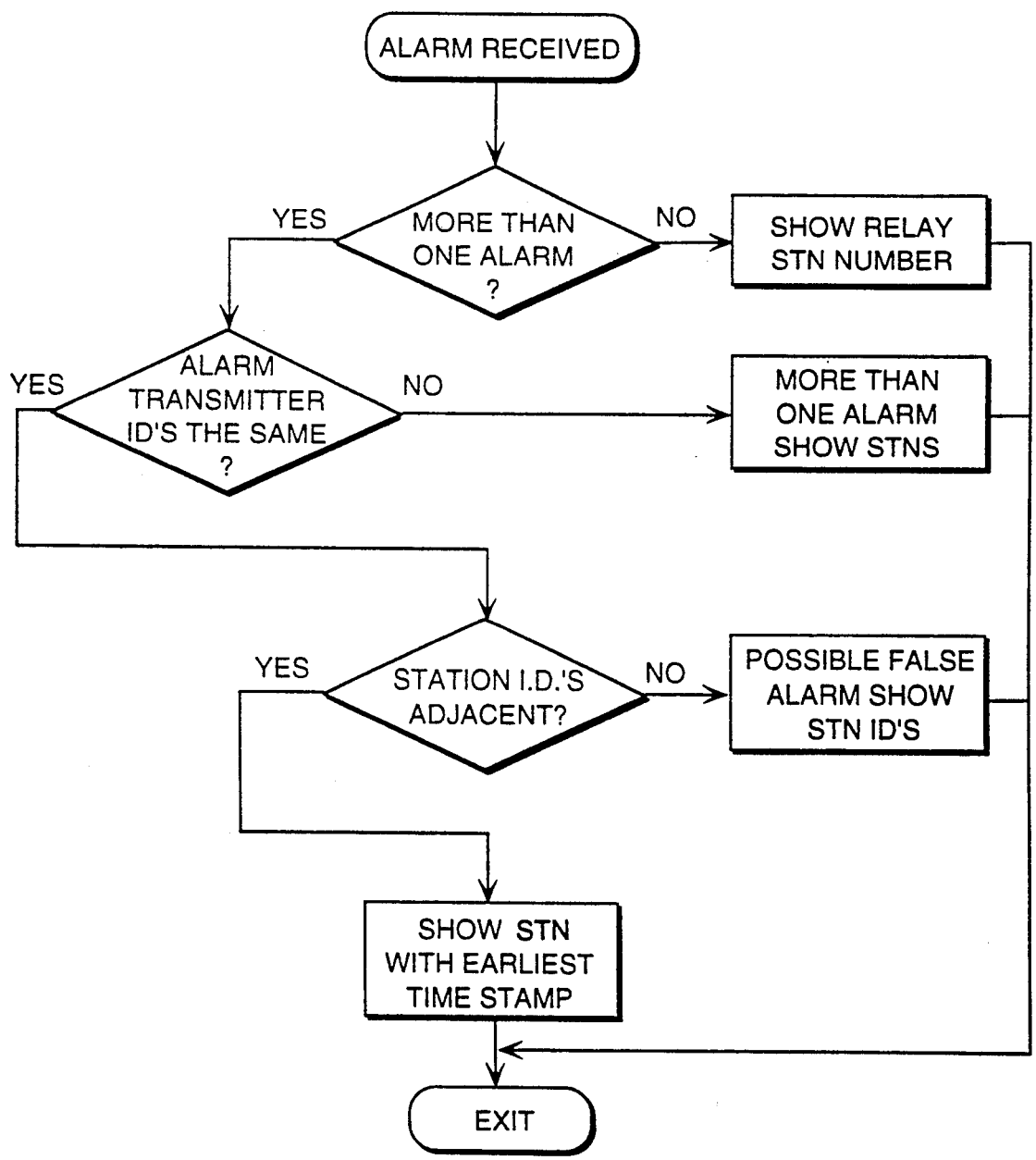
FIG. 7 is a flow chart of a security and communication system in accordance with this invention and using the time stamping procedures described.

FIG. 7 is a flow chart showing the logic that is used in the central processing station computer 34 to use the time encoder to decide which station is closest to the location of the portable transmitter 10.

A more detailed pinpointing through a triangulation-type system can be achieved. When an alarm is received at the central processing station 28, a check is made to see if the alarm is from a single relay station 14 or more than one relay station 14-14c. If the alarm is from more than one relay station, each relay station second signal is checked, by means of the portable transmitter 10 identification code relayed by each relay station 14, to see if it is the same portable transmitter 10 identification code in each relay signal. If the alarm has come from the same portable transmitter 10, the relay station identification codes are checked to see if the stations are adjacent to one another. If they are adjacent, the relay station identification codes are looked up on the table onto which such data was prerecorded. The data tables will show the areas where the relay station zones overlap; the overlap zones will be the most likely place to find the activated portable transmitter.

Figure 8:
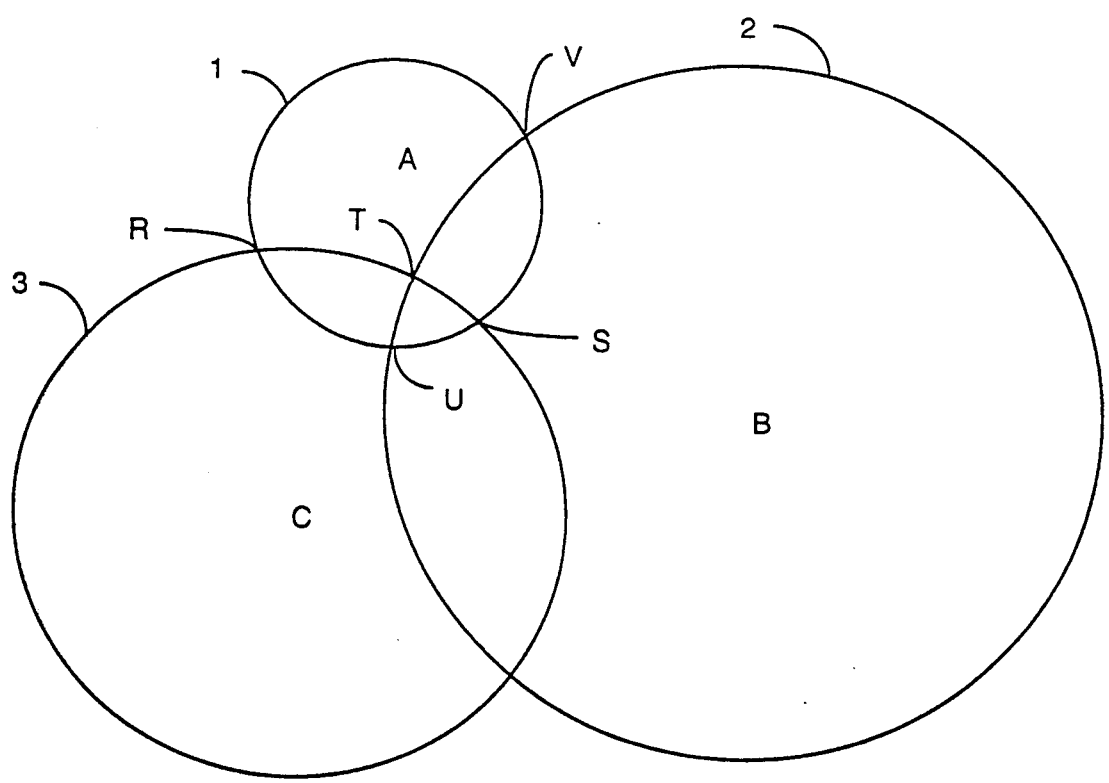
FIG. 8 is a diagrammatic view of the overlapping of three security zones in accordance with the present invention.

FIG. 8 illustrates the operation of the range/sensitivity embodiments of the present invention. In FIG. 8, three relays A, B and C are shown having preset sensitivity ranges of 50 feet, 75 feet and 150 feet respectively. The ranges of sensitivity for relays A, B and C are illustrated by circles 1, 2 and 3 respectively. Intersection r is the point of intersection of range circles 1 and 3, intersection s is the point of intersection of range circles 1 and 3 within circle 2, intersection t is the point of intersection of range circles 2 and 3, intersection u is the point of intersection of range circles 1 and 2 within circle 3, intersection v is the intersection of circles 1 and 2.

In the operation of the security and communication system, if a portable transmitter 10 causes all three relays A, B and C to send second codes to the central processing station 28, then the central processing station 28, upon reviewing a diagram such as FIG. 8, can determine that the portable transmitter 10 is located within the area between intersections s, t and u. However, if relay C were not in operation, transmitter 10 would then have to be searched for in the area between intersections s, t, u and v. If relay C was in operation, but was not triggered by the transmitter 10, central processing station 28 could then determine that the transmitter 10 is located in the area between the intersections s, t and v.

The predetermined ranges of each relay would be stored in the computer 34, and the computer, using a triangulating algorithm, would determine instantaneously, in the manner described above, the location of the transmitter 10.

As an added desired feature, each of relays 14-14c may contain alarm means 40. The actuation of alarm 40 controlled by receiver 42 which, in turn, may be actuated by transmitter 24 via conductor 44. However, a connection between receiver/decoder 18 and alarm 40 is also provided by conductor 46. Alarm receiver 42 carries appropriate and conventional circuitry so that if a signal has been received from receiver 18 through conductor 46, for example within some predetermined, prior time indicating that the signal from transmitter 10 was directly received by receiver/decoder 18, alarm receiver 42 will not actuate alarm 40 despite the signal from transmitter 24.

In this way, the relay directly receiving the first signal will not sound its alarm. However relays that did not receive the first signal but which are close enough to receive this relays second signal will sound their alarms. Further, relays that did receive the first signal, but by virtue of the signal manipulating means 20 did not produce a second signal, will also produce an alarm.

Although illustrative embodiments of the invention have been shown and described it is to be understood that various modifications may be made to the present invention by those skilled in the art without departing from the novel scope of the present invention.

What is claimed is:

1. An improved security and communication system, which comprises:
    at least one portable frequency transmitter having means for sending a first signal, including a first individual identification code to identify the portable transmitter, when activated by the user;
    a central processing station;
    a plurality of radio frequency relays comprising receiving means for receiving said first signal and transmitting means for transmitting a second signal, each of said relays having a coverage area;
    said receiving means further comprising first signal manipulation means for aiding in the determination of to which of said relays said portable frequency transmitter is closest;
    each of said relays being positioned in a predetermined location such that a minimum of overlapping areas of coverage is produced for each of said relays, with said second signal including said first identification code and a second identification code to identify the relay that is transmitting the second signal;
    said transmitting means of all relays producing second signals in response to said first signal, transmitting said second signal to said central processing station, said central processing station having means for determining the location of said portable radio frequency transmitter.

2. The improved security and communication system of claim 1 in which said determining means enabling said central processing station to check whether said second signal is from a single receiver or more than one receiver, if from more than one receiver then checking the identification of the transmitter to determine if the second signal is from more than one transmitter; if it is the same transmitter then determining the overlapping areas of the relay locations.

3. The improved security and communication system of claim 1 in which said first signal manipulating means comprises an attenuator whereby adjusting said attenuator provides precise adjustment of the sensitivity and range of said receiving means allowing only those first signals generated within said sensitivity and range to cause production of said second signals.

4. The improved security and communication system of claim 1 in which said first signal manipulating means comprises a threshold detector and a comparator, whereby said first signal is compared to a preset threshold signal and said second signal is produced only if said first signal exceeds said preset threshold.

5. The improved security and communication system of claim 1 in which said first signal manipulation means comprises a precision time encoder circuit whereby the exact time that said first signal is received by said relay station is encoded and transmitted as part of said second signal and the earliest of said time encoded signal received by said central processing station enables the determination of the closest relay to said portable transmitter.

6. The improved security and communication system of claim 1 in which said signal manipulation means comprises an input attenuator and range selector encoder, the range of the input attenuator is fed to said range selector encoder encoding the range setting into said second code for transmission to said central processing station, whereby the central processing station may determine which second signal received came from the relay with the smallest range thereby enabling the determination of the location of said transmitter.

7. The improved security and communication system of claim 1 in which each of said relays further comprises an alarm means for actuating in response to receipt of said second signal from another relay; each of said relays also having means for inhibiting its alarm in response to receipt of said first signal, whereby the relays directly receiving said first signal and producing said second signals have their alarm inhibited while the alarm means of the other relays are not inhibited.

8. The improved security and communication system of claim 1 in which the length of said antenna is varied to change the sensitivity and range of said receiving means.

9. The improved security and communication system of claim in which said central processing station comprises a microprocessor means for identifying and reporting the location of any said relays activated and the identity of the transmitter sending said first signal.

10. The improved security and communication system of claim 1 including a plurality of said radio frequency transmitters, each of a size small enough to be carried by individual users.

11. An improved security and communication system, which comprises:
    at least one portable frequency transmitter having means for sending a first signal, including a first individual identification code to identify the portable transmitter, when activated by the user;
    a central processing station;
    a plurality of radio frequency relays comprising receiving means and transmitting means, said receiving means comprising an antenna and a receiver, for receiving said first signal, said receiving means further comprising an attenuator inserted between said antenna and said receiver, said attenuator tuning said relays each to a preset range and sensitivity for receiving signals;
    said relays positioned in a predetermined location and having means for receiving said first signal within said range and sensitivity and immediately producing and transmitting a second signal, said second signal including said first identification code and a second identification code to identify the relay that is transmitting the second signal;
    said transmitting means transmitting said second signals to said central processing station whereby said central processing station is provided with data for determining the location of said portable radio frequency transmitter.

12. The improved security and communication system of claim 11 in which each of said radio frequency relays defines a coverage area which may overlap that of another relay, and said central processing station having determining means enabling said central processing station to check whether said second signal is from a single receiver or more than one receiver, if from more than one receiver then checking the identification of the transmitter to determine if the second signal is from more than one transmitter; if it is the same transmitter then determining the overlapping areas of the relay locations.

13. An improved security and communication system, which comprises:
    at least one portable frequency transmitter having means for sending a first signal, including a first individual identification code to identify the portable transmitter, when activated by the user;
    a central processing station;
    a plurality of radio frequency relays comprising receiving means and transmitting means, said receiving means comprising an antenna and a receiver, for receiving said first signal, said receiving means further comprising a threshold detector and comparator in combination with said antenna and said receiver, said comparator preset with a threshold signal strength;
    said relays positioned in a predetermined location and having means for receiving said first signal and comparing said first signal with said preset threshold signal, said relay transmitting a second signal, said second signal including said first identification code and a second identification code to identify the relay that is transmitting the second signal, if said first signal exceeds said preset threshold;
    said transmitting means transmitting said second signals to said central processing station whereby said central processing station is provided with data for determining the location of said portable radio frequency transmitter.

14. The improved security and communication system of claim 13 in which said determining means enabling said central processing station to check whether said second signal is from a single receiver or more than one receiver, if from more than one receiver then checking the identification of the transmitter to determine if the second signal is from more than one transmitter; if it is the same transmitter then determining the overlapping areas of the relay locations.

15. An improved security and communication system, which comprises:
    at least one portable frequency transmitter having means for sending a first signal, including a first individual identification code to identify the portable transmitter, when activated by the user;
    a central processing station;
    a plurality of radio frequency relays comprising receiving means and transmitting means, said receiving means comprising an antenna and a receiver, for receiving said first signal, said receiving means further comprising a precision time encoder circuit;

said relays positioned in a predetermined location and having means for receiving said first signal within said range and sensitivity and immediately producing and transmitting a second signal, said second signal including said first identification code and a second identification code to identify the relay that is transmitting the second signal and the precise time said first signal was received by said relay;

said transmitting means transmitting said second signals to said central processing station whereby said central processing station is provided with data for determining the location of said portable radio frequency transmitter.

16. The improved security and communication system of claim 15 in which said determining means enabling said central processing station to check whether said second signal is from a single receiver or more than one receiver, if from more than one receiver then checking the identification of the transmitter to determine if the second signal is from more than one transmitter; if it is the same transmitter then determining the overlapping areas of the relay locations.

17. An improved security and communication system, which comprises:
   at least one portable frequency transmitter having means for sending a first signal, including a first individual identification code to identify the portable transmitter, when activated by the user;
   a central processing station;
   a plurality of radio frequency relays comprising receiving means and transmitting means, said receiving means comprising an antenna and a receiver, for receiving said first signal, said relays further comprising an attenuator and range selector encoder, said attenuator tuning said relays each to a preset range and sensitivity for receiving signals said range selector encoder encoding said range;

said relays positioned in a predetermined location and having means for receiving said first signal within said range and sensitivity and immediately producing and transmitting a second signal, said second signal including said first identification code and a second identification code, including the range encoded, to identify the relay that is transmitting the second signal;

said transmitting means transmitting said second signals to said central processing station whereby said central processing station is provided with data for determining the location of said portable radio frequency transmitter.

18. The improved security and communication system of claim 17 in which said determining means enabling said central processing station to check whether said second signal is from a single receiver or more than one receiver, if from more than one receiver then checking the identification of the transmitter to determine if the second signal is from more than one transmitter; if it is the same transmitter then determining the overlapping areas of the relay locations.

* * * * *

UNITED STATES PATENT AND TRADEMARK OFFICE
CERTIFICATE OF CORRECTION

PATENT NO. : 5,223,816

DATED : June 29, 1993

INVENTOR(S) : Samuel H. Levinson, Jack R. Caldicott

It is certified that error appears in the above-identified patent and that said Letters Patent is hereby corrected as shown below:

In the claims:

Claim 9, column 7, line 39, insert -- 1 -- after "claim".

Signed and Sealed this

Fifth Day of October, 1993

Attest:

BRUCE LEHMAN

Attesting Officer

Commissioner of Patents and Trademarks